United States Patent
Adelson et al.

(10) Patent No.: US 10,050,442 B2
(45) Date of Patent: *Aug. 14, 2018

(54) ARRANGEMENT FOR AND METHOD OF DYNAMICALLY MANAGING ELECTRICAL POWER BETWEEN AN ELECTRICAL POWER SOURCE AND AN ELECTRICAL LOAD

(71) Applicant: Nextek Power Systems Inc., Detroit, MI (US)

(72) Inventors: Alex M. Adelson, Andes, NY (US); Anthony Mangiaracina, Mobile, AL (US)

(73) Assignee: Nextek Power Systems, Inc., Detroit, MI (US)

( * ) Notice: Subject to any disclaimer, the term of this patent is extended or adjusted under 35 U.S.C. 154(b) by 488 days.

This patent is subject to a terminal disclaimer.

(21) Appl. No.: 14/682,358

(22) Filed: Apr. 9, 2015

(65) Prior Publication Data
US 2015/0214777 A1      Jul. 30, 2015

Related U.S. Application Data

(63) Continuation of application No. 14/524,391, filed on Oct. 27, 2014, now Pat. No. 9,035,490, which is a
(Continued)

(51) Int. Cl.
*H02J 3/00*     (2006.01)
*H02J 7/00*     (2006.01)
(Continued)

(52) U.S. Cl.
CPC ................ *H02J 3/005* (2013.01); *H02J 1/10* (2013.01); *H02J 7/007* (2013.01); *H02J 7/0013* (2013.01);
(Continued)

(58) Field of Classification Search
CPC ........................................................ H02J 3/005
See application file for complete search history.

(56) References Cited

U.S. PATENT DOCUMENTS 5,744,936 A   4/1998   Kawakami
5,929,538 A   7/1999   O'Sullivan
(Continued)

FOREIGN PATENT DOCUMENTS

JP   WO 2008081691 A1 *   7/2008   ............ B60L 3/0046

*Primary Examiner* — Daniel Cavallari
(74) *Attorney, Agent, or Firm* — Kirschstein, Israel, Schiffmiller & Pieroni, P.C.

(57) ABSTRACT

Electrical power is dynamically managed among one or more power sources and one or more loads. A plurality of monitor nodes is connected to an input terminal connected to each source, and to an output terminal connected to each load. A plurality of electrical power storage cells is connected among the input and output terminals, each cell being capable of storing power from at least one of the sources and being capable of discharging stored power to at least one of the loads. A plurality of controllable switches is connected to the cells. A programmed controller dynamically monitors operating conditions at the monitor nodes during operation of each source and each load, and selectively dynamically controls the switches to interconnect the cells in different circuit topologies in response to the monitored operating conditions.

17 Claims, 4 Drawing Sheets

Related U.S. Application Data continuation of application No. 12/905,312, filed on Oct. 15, 2010, now Pat. No. 8,957,543.

(51) Int. Cl.
  *H02J 7/34* (2006.01)
  *H02J 1/10* (2006.01)
  *H02J 7/04* (2006.01)
  *H02J 7/35* (2006.01)

(52) U.S. Cl.
  CPC .............. *H02J 7/0068* (2013.01); *H02J 7/34* (2013.01); *H02J 7/045* (2013.01); *H02J 7/35* (2013.01); *H02J 2007/0067* (2013.01); *Y10T 307/313* (2015.04); *Y10T 307/344* (2015.04); *Y10T 307/391* (2015.04)

(56) References Cited

U.S. PATENT DOCUMENTS

| | | |
|---|---|---|
| 5,959,368 A | 9/1999 | Kubo |
| 5,994,795 A | 11/1999 | Gabillet |
| 6,497,974 B2 | 12/2002 | Fuglevand |
| 7,394,674 B2 | 7/2008 | Huang |
| 7,449,798 B2 | 11/2008 | Suzuki |
| 7,615,888 B2 | 11/2009 | Lathrop |
| 7,701,083 B2 | 4/2010 | Savage |
| 8,513,832 B2 | 8/2013 | Hunter |
| 2006/0092583 A1 | 5/2006 | Alahmad |
| 2007/0062744 A1 | 3/2007 | Weidenheimer |
| 2007/0268001 A1 | 11/2007 | Doll |
| 2008/0018175 A1 | 1/2008 | McNamara |
| 2008/0042621 A1* | 2/2008 | Miglioranza ......... H02J 7/1407 320/150 |
| 2009/0189445 A1 | 1/2009 | Strizki |
| 2010/0065349 A1* | 3/2010 | Ichikawa .............. B60L 3/0046 180/65.1 |
| 2010/0134115 A1* | 6/2010 | Ohnuki ............... B60L 11/1861 324/429 |
| 2010/0198421 A1 | 8/2010 | Fahimi |

* cited by examiner

| | CURRENT PATH STATES (3 VOLTAGE SUPPLY LEVELS $V_1, V_2$ & $V_3$) | | | | | | | | | | | |
|---|---|---|---|---|---|---|---|---|---|---|---|---|
| X STATE | CIRCUIT | M1 | M2 | M3 | M4 | MA | MB | MC | MD | MX | MY | |
| CHARGE | STACK PARALLEL | X | O | X | O | O | O | O | O | X | X | |
| DISCHARGE | STACK PARALLEL | O | X | O | X | O | O | O | O | X | X | |
| CHARGE | STACK SERIES | O | O | O | O | X | O | X | O | O | O | |
| DISCHARGE | STACK SERIES | O | O | O | O | O | X | O | X | O | O | |
| CHARGE | INDEPEN'T | O | O | O | O | O | O | O | O | X | O | B-Cap 1 |
| DISCHARGE | INDEPEN'T | O | O | O | O | O | O | O | O | X | O | B-Cap 1 |
| CHARGE | INDEPEN'T | O | O | O | O | O | O | O | O | O | X | B-Cap 2 |
| DISCHARGE | INDEPEN'T | O | O | O | O | O | O | O | O | O | X | B-Cap 2 |
| CHARGE | INDEPEN'T | O | O | O | O | O | O | O | O | O | O | B-Cap 3 |
| DISCHARGE | INDEPEN'T | O | O | O | O | O | O | O | O | O | O | B-Cap 3 |

FIG. 4 CON'T

ARRANGEMENT FOR AND METHOD OF DYNAMICALLY MANAGING ELECTRICAL POWER BETWEEN AN ELECTRICAL POWER SOURCE AND AN ELECTRICAL LOAD

CROSS REFERENCE TO RELATED APPLICATIONS

This application is a continuation of U.S. patent application Ser. No. 14/524,391, filed Oct. 27, 2014, now allowed, which, in turn, is a continuation of U.S. patent application Ser. No. 12/905,312, filed Oct. 15, 2010, now U.S. Pat. No. 8,957,543.

DESCRIPTION OF THE RELATED ART

Powered systems for supplying alternating current (AC) and direct current (DC) electrical power from a myriad of non-renewable energy sources that typically burn hydrocarbon fuel in engine-generators, turbine-generators, thermal-electric generators, fuel cells, etc., and from a myriad of renewable energy sources, such as photovoltaic cells, wind generators, hydroelectric devices, biomass generators, solar thermal systems, geothermal systems, etc., for delivery to various electrical inductive loads, such as motors and ballasts for fluorescent or vapor-arc lighting, and/or resistive loads, such as common filament light bulbs, and/or capacitive loads, such as capacitive motor starters, are well known. Since photovoltaic cells and wind generators, for example, depend upon an unpredictable availability of the source of energy, e.g. sunlight or wind, such renewable energy sources typically produce unpredictable, unregulated AC or DC power with uncontrolled frequency or voltage levels at uncertain, variable times. Hence, powered systems utilizing such sources typically collect and store energy in a DC battery bank over time, then apply the stored DC power directly to the loads as needed, and are typically operated as stand-alone systems. The battery bank provides a standby energy reservoir for the powered system.

Although generally satisfactory for their intended purpose, the known powered systems are inefficient. As noted above, the supply of power is erratic and variable because one or more of the electrical power sources may not be available at all times and, even when available, may not always be operating at its rated nominal power condition or most economical state. In addition, the loading condition of the various loads is variable as one or more loads are brought online and offline, as well as during the course of their normal operation. The above-mentioned battery bank serves to compensate for such variable power and loading conditions, but charging and recharging the battery bank takes a considerable time, thereby degrading system efficiency. System efficiency is lowered with no or poor management of which of the available power sources, and how much of the power from each of such available power sources, is to be distributed and delivered to the one or more of the loads that require such power, especially when all such actions advantageously need to be rapidly performed while the power and loading conditions vary. Greater efficiency is both an economic and conservation goal.

SUMMARY OF THE INVENTION

One aspect of the present invention resides, briefly stated, in an arrangement for dynamically and efficiently managing electrical power among one or more electrical power sources that supply electrical power and one or more electrical loads that consume electrical power. The sources can include any alternating current (AC) source, such as an AC power grid or supply mains, any direct current (DC) source, or any combined AC/DC source. The sources can include any non-renewable energy source, for example, one that typically burns hydrocarbon fuel in engine-generators, turbine-generators, thermal-electric generators, fuel cells, etc., or any renewable energy source, such as photovoltaic cells, wind generators, hydroelectric devices, biomass generators, solar thermal systems, geothermal systems, etc. The loads can include any electrical inductive loads, such as motors and ballasts for fluorescent or vapor-arc lighting, and/or any resistive loads, such as common filament light bulbs, and/or any capacitive loads, such as capacitive motor starters.

The arrangement includes an input terminal connected to each source, an output terminal connected to each load, and a plurality of monitor nodes connected to each input terminal and each output terminal. A plurality of electrical power storage cells is connected among the input and output terminals. As described below, each cell is capable of storing power from at least one of the sources and is capable of discharging stored power to at least one of the loads. Preferably, each cell includes a capacitor by itself, or a parallel combination of a battery and a capacitor, for storing DC voltage from the at least one source and for discharging the stored DC voltage to the at least one load. Advantageously, each such cell acts as a voltage regulator and filter, is rechargeable and has an extremely low internal resistance for rapid recharging with a high efficiency in energy storage exceeding 95%. The cells are preferably architecturally identical and interchangeable with one another.

The arrangement further includes a plurality of controllable switches connected to the cells and having control inputs for enabling each switch to be switched between switching states. Advantageously, each switch is a transistor having a gate, a base or a trigger as the control input. Each switch can, for example, be a solid-state switch, such as a field effect transistor (FET), especially a HEXFET or a MOSFET, or a FlipFET, or an insulated gate bipolar transistor (IGBT), or a silicon controlled rectifier (SCR), or their equivalent, e.g., a relay. A plurality of diodes is also connected in the arrangement to control the direction of DC current flowing between the input and output terminals. The diodes block the flow of the DC current along unwanted paths through the arrangement.

The arrangement still further includes a programmed microprocessor or controller operative for dynamically monitoring operating conditions, e.g., operating voltages, at the monitor nodes during operation of each source and each load, and for selectively dynamically controlling the switches at their control inputs to interconnect the cells in different circuit topologies in response to the monitored operating conditions. The controller enables each cell in one of the switching states, e.g., a closed state, to store the voltage from at least one of the sources, and enables each cell in the other of the switching states, e.g., an open state, to discharge the stored voltage to at least one of the loads.

The controller advantageously accesses a memory or look-up table with data corresponding to the stored circuit topologies, and retrieves the data in response to the monitored operating conditions. For example, in some different topologies, all the cells are connected in series and/or in parallel and/or in series-parallel with one another for charging and/or discharging; and in other different topologies, individual cells are selected for charging and/or discharging.

The various topologies can be simultaneously or sequentially implemented in single or multiple steps.

The cells are preferably arranged in layers. One of the cells is arranged in a base layer, and another of the cells, together with one or more of the switches, are arranged in a switching layer. The arrangement, also called a module, comprises a base layer and one or more of the switching layers. The module can have any number of switching layers and, hence, the module is readily scalable. This not only reduces cost, but also enables the resolution or number of switching layers to be selected as desired for a particular application. The switching layers can be arranged in mutually perpendicular planes. For example, one or more of the switching layers can be interconnected in two dimensions and lie in a horizontal or X-Y plane, and then, one or more additional switching layers can be interconnected in a third dimension and lie in a vertical or Z plane, thereby greatly increasing the number of available circuit topologies that can be selected by the controller. Furthermore, the arrangement is symmetrical, in that the aforementioned input terminals, as well as the aforementioned output terminals, can be located at either a right side or a left side of the arrangement, thereby enabling the external sources or the external loads to be connected at either side of the arrangement.

Still another feature of the present invention resides in a method of dynamically managing electrical power between each electrical power source and each electrical load. The method is performed by connecting each input terminal to each source, connecting each output terminal to each load, connecting the monitor nodes to each input and output terminal, connecting the electrical power storage cells among the input and output terminals, each cell being capable of storing power from at least one of the sources and being capable of discharging stored power to at least one of the loads, connecting the controllable switches to the cells, each switch having a control input for enabling the switch to be switched between switching states, dynamically monitoring operating conditions at the monitor nodes during operation of each source and each load, selectively dynamically controlling the switches at the control inputs to interconnect the cells in different circuit topologies in response to the monitored operating conditions, enabling each cell in one of the switching states to store the power from the at least one source, and enabling each cell in the other of the switching states to discharge the stored power to the at least one load.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
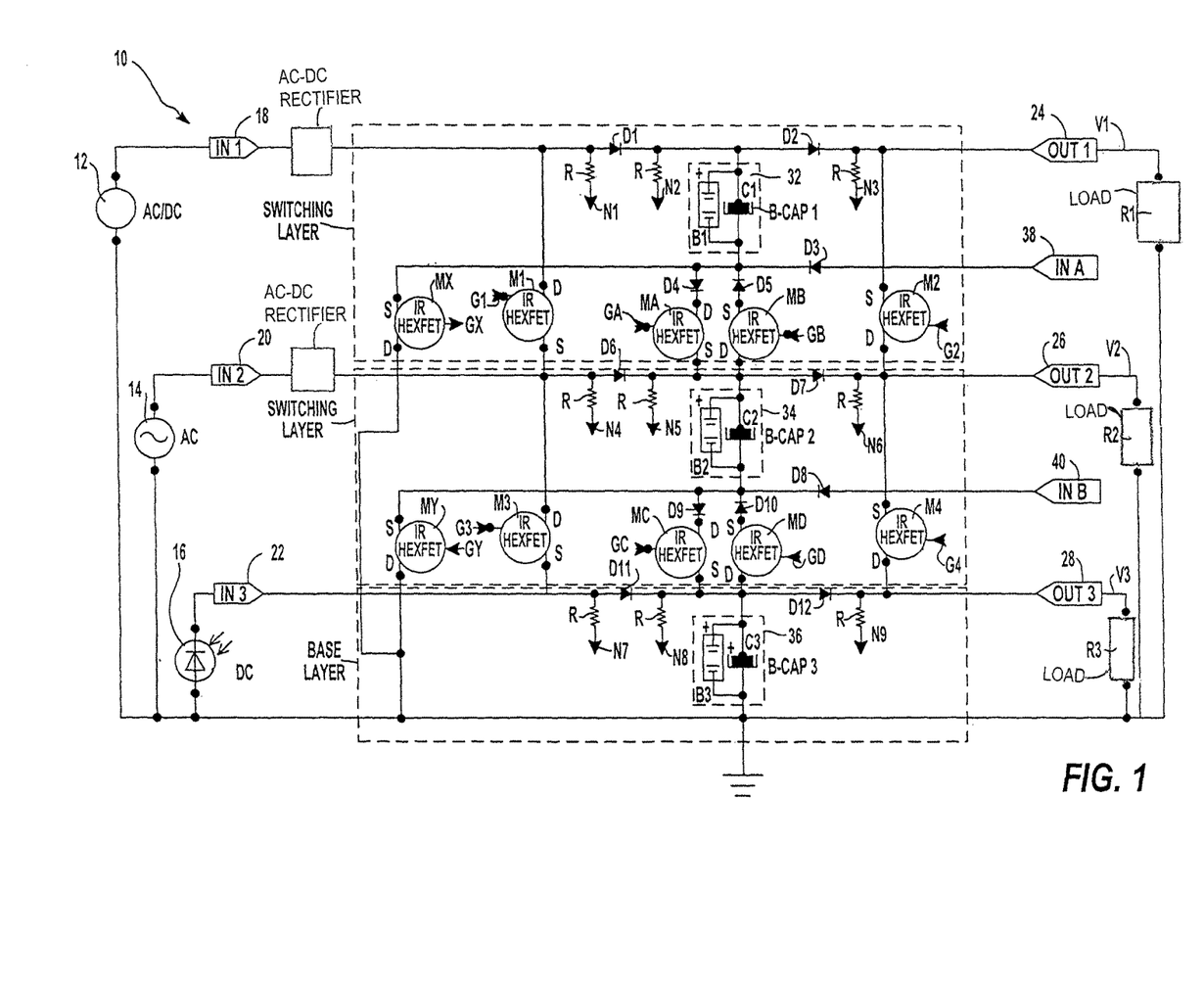
FIG. 1 is an electrical circuit schematic of part of one embodiment of an arrangement for dynamically managing electrical power between at least one electrical power source and at least one electrical load in accordance with this invention.

Reference numeral 10 generally identifies an arrangement for dynamically and efficiently managing electrical power among one or more external electrical power sources 12, 14 and 16 that supply electrical power and one or more external electrical loads R1, R2 and R3 that consume electrical power. The sources can include any alternating current (AC) source 14, such as an AC power grid or supply mains, any direct current (DC) source 16, or any combined AC/DC source 12. The sources 12, 14 and 16 can include any non-renewable energy source, for example, one that typically burns hydrocarbon fuel in engine-generators, turbine-generators, thermal-electric generators, fuel cells, etc., or any renewable energy source, such as photovoltaic cells, wind generators, hydroelectric devices, biomass generators, solar thermal systems, geothermal systems, etc. Although three sources are illustrated in FIG. 1, any number of sources, including just one source, can be employed. The loads R1, R2 and R3 can include any electrical inductive loads, such as motors and ballasts for fluorescent or vapor-arc lighting, and/or any resistive loads, such as common filament light bulbs, and/or any capacitive loads, such as capacitive motor starters. Although three loads are illustrated in FIG. 1, any number of loads, including just one load, can be employed.

The arrangement 10 includes at least one input terminal and, as illustrated, a plurality of input terminals 18, 20 and 22 (labeled IN 1, IN 2 and IN 3) connected to each source 12, 14 and 16, at least one output terminal and, as illustrated, a plurality of output terminals 24, 26 and 28 (labeled OUT 1, OUT 2 and OUT 3) connected to each load R1, R2 and R3, and a plurality of monitor nodes N1, N2, N3, N4, N5, N6, N7, N8, and N9, each connected to the input and output terminals via a resistor R. As described below, a programmed microprocessor or controller 30 (see FIG. 2) dynamically monitors operating conditions, e.g., operating voltages, at the monitor nodes during operation of the sources and the loads. The controller 30 has input pins 1-9 respectively connected to the monitor nodes N1, N2, N3, N4, N5, N6, N7, N8, and N9.

A plurality of diodes D1, D2, D6, D7, D11 and D12 is also connected in the arrangement 10 to control the direction of DC current flowing between the input and output terminals. The diodes block the flow of the DC current along unwanted paths. Monitor nodes N1, N4 and N7 are respectively connected to input terminals 18, 20 and 22. Monitor nodes N3, N6 and N9 are respectively connected to output terminals 24, 26 and 28. Diodes D1, D6 and D11 are connected between monitor node pairs N1, N2; N4, N5; and N7, N8.

A plurality of electrical power storage cells 32, 34 and 36 is connected among the input and output terminals. As described below, each cell 32, 34 and 36 is capable of storing power from at least one of the sources and is capable of discharging stored power to at least one of the loads. Preferably, each cell 32, 34 and 36 includes a capacitor by itself, or a parallel combination of a battery (B1, B2 and B3) and a capacitor (C1, C2 and C3), for storing DC voltage from the at least one source and for discharging the stored DC voltage to the at least one load. Advantageously, each such cell (also labeled B-CAP 1, B-CAP 2 and B-CAP 3), acts as a voltage regulator and filter, is rechargeable and has an extremely low internal resistance for rapid recharging with a high efficiency in energy storage exceeding 95%. Advantageously, the cells are electronic double layer capacitors, also known as supercaps or ultracaps. The cells 32, 34 and 36 are preferably architecturally identical and interchangeable with one another.

The arrangement 10 further includes a plurality of controllable switches M1, M2, M3 and M4 connected to the cells and having control inputs G1, G2, G3 and G4 for enabling each switch to be switched between open and closed switching states. Advantageously, each switch is a transistor having a gate, a base or a trigger as the control input. Each switch can, for example, be a solid-state switch, such as a field effect transistor (FET), especially a HEXFET (as illustrated) or a MOSFET, or a FlipFET, or an insulated gate bipolar transistor (IGBT), or a silicon controlled rectifier (SCR), or their equivalent, e.g., a relay. Switch M1 is connected across cell 32 between input terminals 18, 20. Switch M2 is connected across cell 32 between output terminals 24, 26. Switch M3 is connected across cell 34 between input terminals 20, 22. Switch M4 is connected across cell 34 between output terminals 26, 28.

The arrangement 10 further includes a plurality of control input terminals 38, 40 (labeled IN A and IN B). A parallel combination, having diode D4 and switch MA in one branch, and diode D5 and switch MB in another branch, is connected across terminals 38 and 26, and interconnects cells 32 and 34. Another parallel combination, having diode D9 and switch MC in one branch, and diode D10 and switch MD in another branch, is connected across terminals 40 and 28, and interconnects cells 34 and 36. Switches MA, MB, MC and MD have control inputs GA, GB, GC and GD. Additional switch MX having control input GX is connected via diode D3 between terminal 38 and ground. Additional switch MY having control input GY is connected via diode D8 between terminal 40 and ground.

Figure 2:
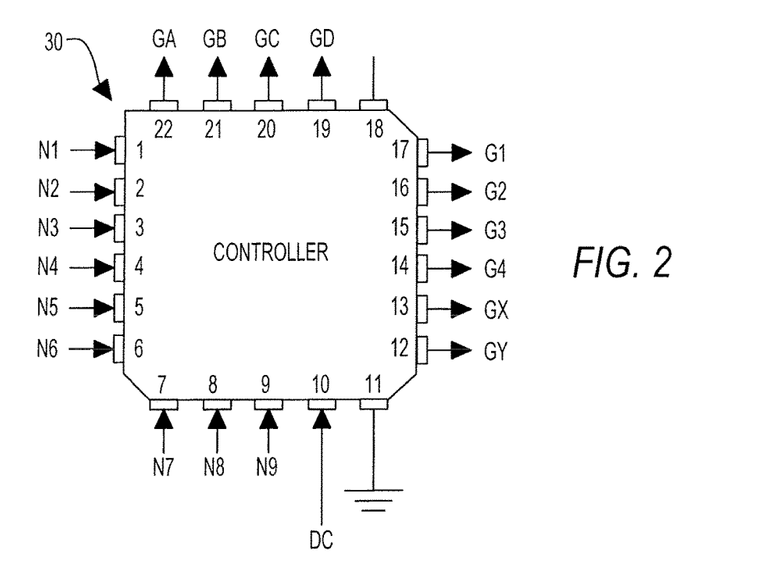
FIG. 2 is a programmed controller for use with the arrangement of FIG. 1.

The controller 30, as previously mentioned, dynamically monitors the operating conditions, e.g., the operating voltages, at all the monitor nodes N1, N2, N3, N4, N5, N6, N7, N8, and N9 during operation of each source and each load. The controller 30 detects the voltages at one or more of these nodes, and determines, for example, whether a particular source is supplying power, and/or whether a particular load is receiving power. The controller 30 also selectively dynamically controls all the switches M1, M2, M3, M4, MA, MB, MC, MD, MX and MY at their respective control inputs to interconnect the cells 32, 34 and 36 in different circuit topologies in response to the monitored operating conditions. The controller 30 has output pins 12-17 and 19-22 respectively connected to these control inputs. Pin 10 is supplied with a DC voltage. Pin 11 is grounded. Pin 18 is reserved. The controller 30, the cells 32, 34 and 36, and all the switches M1, M2, M3, M4, MA, MB, MC, MD, MX and MY are DC devices. Hence, if any AC source, such as source 14, is connected to an input terminal, then an AC-to-DC rectifier (not illustrated) is employed to convert the AC voltage to DC voltage.

The controller 30 enables each cell in one of the switching states, e.g., a closed state, to store the voltage from at least one of the sources, and enables each cell in the other of the switching states, e.g., an open state, to discharge the stored voltage to at least one of the loads. The controller 30 advantageously accesses a memory or look-up table (see FIG. 3) with data corresponding to the stored circuit topologies, and retrieves the data in response to the monitored operating conditions. For example, in some different topologies, all the cells are connected in series and/or in parallel and/or in series-parallel with one another for charging and/or discharging; and in other different topologies, individual cells are selected for charging and/or discharging. The various topologies can be simultaneously or sequentially implemented in single or multiple steps.

Figure 3:
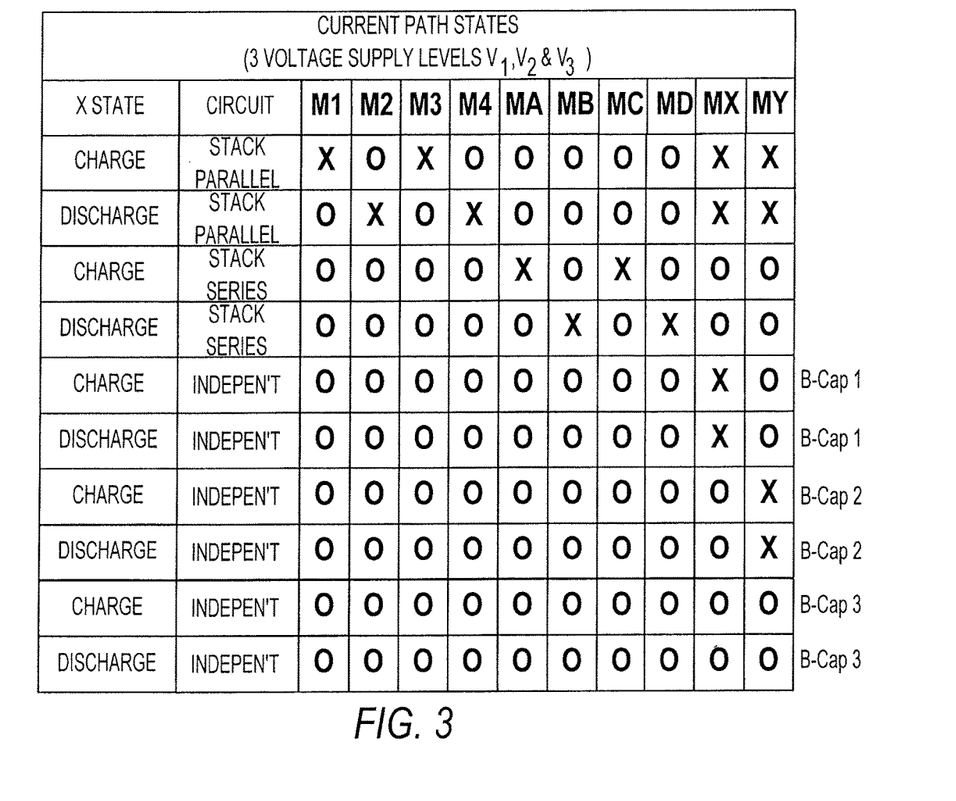
FIG. 3 is a look-up table accessed by the controller of FIG. 2.

More particularly, the table of FIG. 3 depicts the switches M1, M2, M3, M4, MA, MB, MC, MD, MX and MY across a top row. The first column indicates whether the cells are charged or discharged. The second column indicates the topology. An "X" at the intersection of a column and a row indicates that a particular switch is switched by the controller 30 to a closed state. An "O" at the intersection of a column and a row indicates that a particular switch is switched by the controller 30 to an open state.

Figure 4:
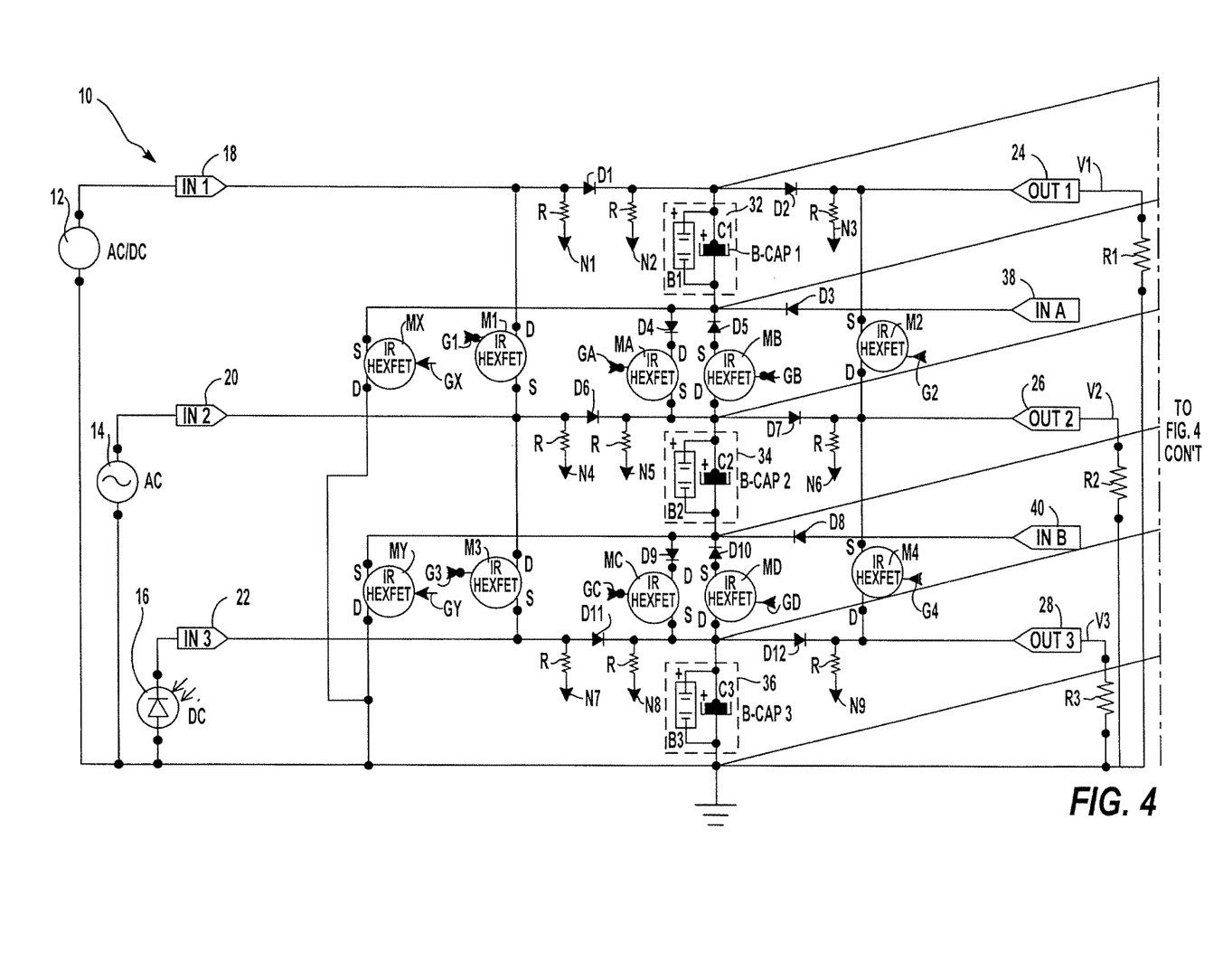
FIG. 4 and FIG. 4 CON'T comprise an electrical circuit schematic of another embodiment of the arrangement in accordance with this invention.

The cells are preferably arranged in layers. One of the cells, e.g., 36, is arranged in a base layer, preferably together with the diodes D11 and D12 and with the monitor nodes N7, N8 and N9. Another of the cells, e.g., 34, is arranged in a switching layer, together with one or more of the switches M3, M4, MC, MD and MY, and with the diodes D6 and D7, and with the monitor nodes N4, N5 and N6. Still another of the cells, e.g., 32, is arranged in another switching layer, together with one or more of the switches M1, M2, MA, MB and MX, and with the diodes D1 and D2, and with the monitor nodes N1, N2 and N3. The arrangement, also called a module, comprises one base layer and one or more of the switching layers. The module can have any number of switching layers and, hence, the module is readily scalable. This not only reduces cost, but also enables the resolution or number of layers to be selected as desired for a particular application. The layers can be arranged in mutually perpendicular planes. For example, the aforementioned base layer and one or more of the aforementioned switching layers can be interconnected in two dimensions and lie in a horizontal or X-Y plane, and then, additional switching layers, which each include additional cells B-CAP 4, B-CAP 5 and B-CAP 6, as best seen in FIG. 4, can be interconnected in a third dimension and lie in a vertical or Z plane, thereby greatly increasing the number of available circuit topologies that can be selected by the controller. Furthermore, the arrangement is symmetrical and bi-directional, in that the input terminals 12, 14 and 16, as well as the output terminals 24, 26 and 28, can be located at either a right side or a left side of the arrangement, thereby enabling the external sources or the external loads to be connected at either side of the bi-directional arrangement.

The multiple path, symmetrical, matrix-like, architecture enables the arrangement 10 to be infinitely expandable, of low cost and highly efficient. In some cases, the efficiency approaches or exceeds 99%. The arrangement 10 is comprised of as many duplicate switching layers as desired. The number of such switching layers defines the available resolution of the arrangement. The arrangement efficiently integrates multiple external power sources, including different AC and DC sources that may vary between high and low impedances, and blends one or more of their available output powers for storage in one or more of the cells and/or for delivery to one or more of the loads. If no or insufficient output power is available for a particular loading condition, then the cells assume the responsibility for blending one or more of their available stored powers for delivery to one or more of the loads. Power storage or transfer can occur simultaneously or sequentially.

The arrangement 10 can be described as an intelligent energy collector and distributor, that operates in real time. The base layer and one or more switching layers can be mounted on a single printed circuit board (PCB). Additional PCBs having one or more switching layers can be easily interconnected to the first-mentioned PCB. The arrangement 10 employs a simple modular structure assembled in a repetitive pattern. The number of cells is defined by the maximum load power and voltage resolution required. Continuous or frequent monitoring of the state of the loads and of the sources is desired. By monitoring the monitor nodes, the controller 30 can detect whether any particular layer or PCB is defective, and can control the switches to bypass any such defective layer or PCB.

It will be understood that each of the elements described above, or two or more together, also may find a useful application in other types of constructions differing from the types described above. For example, the two HEXFETs MA and MB and their diodes D4 and D5 can be replaced by a single FlipFET.

While the invention has been illustrated and described as an arrangement for, and a method of, dynamically managing electrical power among one or more electrical power sources and one or more electrical loads, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

We claim:

1. An arrangement for managing electrical power between an electrical power source that supplies electrical power and an electrical load that consumes electrical power, the arrangement comprising:
    a plurality of terminals operatively connected to the power source and the electrical load, respectively;
    a plurality of monitor nodes operatively connected to the terminals;
    a plurality of electrical power storage cells operatively connected to the terminals, each storage cell including a parallel combination of a battery id a capacitor for storing voltage from the power source, and for discharging stored voltage to the electrical load;
    a plurality of controllable switches operatively connected to the storage cells and having control inputs for enabling each switch to be switched between switching states; and
    a programmed controller operative for monitoring operating conditions at the monitor nodes during operation of the power source and the electrical load, for selectively controlling the switches at the control inputs to interconnect the storage cells in different circuit topologies in response to the monitored operating conditions, for enabling each storage cell in one of the switching states to store the voltage from the power source, and for enabling each storage cell in the other of the switching states to discharge the stored voltage to the electrical load.

2. The arrangement of claim 1, wherein one of the terminals is operatively connected to the power source that is one of a combined source having alternating current (AC) and direct current (DC), a sole AC source, and a sole DC source; and wherein another of the terminals is operatively connected to the electrical load that is one of an AC load and a DC load.

3. The arrangement of claim 1, wherein the terminals are located at opposite sides of the arrangement and are bidirectional to enable the power source and the electrical load to be operatively connected to the terminals at the opposite sides of the arrangement.

4. The arrangement of claim 1, wherein each switch is a transistor having one of a gate, a base and a trigger as the control input.

5. The arrangement of claim 2, and at least one diode to control the direction of DC current flowing between the terminals.

6. The arrangement of claim 1, and a memory stored with data corresponding to the stored circuit topologies.

7. The arrangement of claim 1, wherein one of the storage cells and one of the switches are together arranged in a switching layer, and wherein another of the storage cells is arranged in a base layer.

8. An arrangement for managing electrical power between an electrical power source that supplies electrical power and an electrical load that consumes electrical power, the arrangement comprising:
    a plurality of terminals operatively connected to the power source and the electrical load, respectively;
    a plurality of monitor nodes operatively connected to the terminals;
    a plurality of electrical power storage cells operatively connected to the terminals, each storage cell being capable of storing power from the power source, and being capable of discharging stored power to the electrical load, one of the storage cells being arranged in a base layer;
    a plurality of controllable switches operatively connected to the storage cells and having control inputs for enabling each switch to be switched between switching states, another of the storage cells and at least one of the switches being together arranged in a switching layer; and
    a programmed controller operative for monitoring operating conditions at the monitor nodes during operation of the power source and the electrical load, for selectively controlling the switches at the control inputs to interconnect the storage cells in different circuit topologies in response to the monitored operating conditions, for enabling each storage cell in one of the switching states to store the power from the power source, and for enabling each storage cell in the other of the switching states to discharge the stored power to the electrical load.

9. An arrangement for managing electrical power between an electrical power source that supplies electrical power and an electrical load that consumes electrical power, the arrangement comprising:
    a plurality of terminals operatively connected to the power source and the electrical load, respectively;
    a base layer having an electrical power storage cell and a first monitor node;
    a switching layer having another electrical power storage cell, a second monitor node, and a controllable switch operatively connected to the other storage cell and having a control input for enabling the switch to be switched between switching states;
    each monitor node and each storage cell being operatively connected to the terminals, each storage cell having a capacitor capable of storing voltage from the power source, and being capable of discharging stored voltage to the electrical load; and a programmed controller operative for monitoring operating conditions at the monitor nodes in both the switching layer and the base layer during operation of the power source and the electrical load, for selectively controlling the switch in the switching layer at the control input to interconnect the storage cells in response to the monitored operating conditions, for enabling at least one of the storage cells in one of the switching states to store the voltage from the power source, and for enabling at least one of the storage cells in the other of the switching states to discharge the stored voltage to the electrical load.

10. The arrangement of claim 9, wherein one of the terminals is operatively connected to the power source that is one of a combined source having alternating current (AC) and direct current (DC), a sole AC source, and a sole DC source; and wherein another of the terminals is operatively connected to the electrical load that is one of an AC load and a DC load.

11. The arrangement of claim 9, wherein the terminals are located at opposite sides of the arrangement and are bidirectional to enable the power source and the electrical load to be operatively connected to the terminals at the opposite sides of the arrangement.

12. The arrangement of claim 9, wherein each storage cell includes a battery in parallel with each capacitor.

13. The arrangement of claim 9, wherein the switch is a transistor having one of a gate, a base and a trigger as the control input.

14. The arrangement of claim 10, and at least one diode to control the direction of DC current flowing between the terminals.

15. The arrangement of claim 9, wherein the arrangement has a single base layer, and a plurality of switching layers.

16. The arrangement of claim 15, wherein the controller monitors the monitor nodes to detect whether any layer is defective and bypasses any defective layer by controlling the switches.

17. An arrangement for managing electrical power between at least one electrical power source that supplies electrical power under variable power conditions and at least one electrical load that consumes electrical power under variable load conditions, the arrangement comprising:

at least one input terminal operatively connected to the at least one source;

at least one output terminal operatively connected to the at least one load;

a plurality of monitor nodes operatively connected to the at least one input terminal and the at least one output terminal;

a control switch switchable between operating states;

at least one electrical power storage cell operatively connected to the control switch in a switching layer, the at least one power storage cell being capable of storing power from the at least one power source in one of the operating states of the control switch, and being capable of discharging stored power to the at least one load in another of the operating states of the control switch;

another electrical power storage cell being arranged in a base layer; and a programmed controller for monitoring the variable power conditions and the variable load conditions at the monitor nodes during operation of the at least one source and the at least one load, and for controlling the control switch and the power storage cells to not discharge the stored power to the at least one load when the variable load conditions are matched to the variable power conditions.

* * * * *